United States Patent
Ferris et al.

(10) Patent No.: US 8,364,819 B2
(45) Date of Patent: Jan. 29, 2013

(54) SYSTEMS AND METHODS FOR CROSS-VENDOR MAPPING SERVICE IN CLOUD NETWORKS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 427 days.

(21) Appl. No.: 12/790,162

(22) Filed: May 28, 2010

(65) Prior Publication Data

US 2011/0296022 A1 Dec. 1, 2011

(51) Int. Cl.
*G06F 15/16* (2006.01)
*G06F 12/00* (2006.01)

(52) U.S. Cl. ...................................... 709/226; 709/203

(58) Field of Classification Search .......... 709/223–229, 709/203, 217–218, 250
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — Zarni Maung
(74) *Attorney, Agent, or Firm* — Lowenstein Sandler PC

(57) ABSTRACT

Embodiments relate to systems and methods for a cross-vendor mapping service in cloud networks. A mapping service can be provided external to one or more sets of clouds which can access vendor databases in those clouds, and generate reports on software compatibility for software resources available in those diverse cloud networks. A user in an original cloud may wish to construct an image of a set of appliances or other services or entities in a second, external cloud or clouds. The external target cloud(s) may have different application sets, and/or applications available from different vendors, than those software resources hosted in the original cloud. A mapping service external to the participating clouds can enumerate the applications or other resources available in an external cloud, and generate a mapping or translation of those components to construct desired appliance images in that destination. Subscription terms can also be translated between clouds.

20 Claims, 5 Drawing Sheets

U.S. PATENT DOCUMENTS

| | | | |
|---|---|---|---|
| 2006/0130144 | A1 | 6/2006 | Wernicke |
| 2006/0177058 | A1 | 8/2006 | Sarwono et al. |
| 2006/0224436 | A1 | 10/2006 | Matsumoto et al. |
| 2007/0011291 | A1 | 1/2007 | Mi et al. |
| 2007/0028001 | A1 | 2/2007 | Phillips et al. |
| 2007/0226715 | A1 | 9/2007 | Kimura et al. |
| 2007/0283282 | A1 | 12/2007 | Bonfiglio et al. |
| 2007/0294676 | A1 | 12/2007 | Mellor et al. |
| 2008/0080396 | A1 | 4/2008 | Meijer et al. |
| 2008/0080718 | A1 | 4/2008 | Meijer et al. |
| 2008/0082538 | A1 | 4/2008 | Meijer et al. |
| 2008/0082601 | A1 | 4/2008 | Meijer et al. |
| 2008/0083025 | A1 | 4/2008 | Meijer et al. |
| 2008/0083040 | A1 | 4/2008 | Dani et al. |
| 2008/0086727 | A1 | 4/2008 | Lam et al. |
| 2008/0091613 | A1 | 4/2008 | Gates et al. |
| 2008/0104608 | A1 | 5/2008 | Hyser et al. |
| 2008/0215796 | A1 | 9/2008 | Lam et al. |
| 2008/0240150 | A1 | 10/2008 | Dias et al. |
| 2009/0012885 | A1 | 1/2009 | Cahn |
| 2009/0025006 | A1 | 1/2009 | Waldspurger |
| 2009/0037496 | A1 | 2/2009 | Chong et al. |
| 2009/0089078 | A1 | 4/2009 | Bursey |
| 2009/0099940 | A1 | 4/2009 | Frederick et al. |
| 2009/0132695 | A1 | 5/2009 | Surtani et al. |
| 2009/0177514 | A1 | 7/2009 | Hudis et al. |
| 2009/0210527 | A1 | 8/2009 | Kawato |
| 2009/0210875 | A1 | 8/2009 | Bolles et al. |
| 2009/0217267 | A1 | 8/2009 | Gebhart et al. |
| 2009/0222805 | A1 | 9/2009 | Faus et al. |
| 2009/0228950 | A1 | 9/2009 | Reed et al. |
| 2009/0248693 | A1 | 10/2009 | Sagar et al. |
| 2009/0249287 | A1 | 10/2009 | Patrick |
| 2009/0260007 | A1 | 10/2009 | Beaty et al. |
| 2009/0265707 | A1 | 10/2009 | Goodman et al. |
| 2009/0271324 | A1 | 10/2009 | Jandhyala et al. |
| 2009/0276771 | A1 | 11/2009 | Nickolov et al. |
| 2009/0287691 | A1 | 11/2009 | Sundaresan et al. |
| 2009/0293056 | A1 | 11/2009 | Ferris |
| 2009/0299905 | A1 | 12/2009 | Mestha et al. |
| 2009/0299920 | A1 | 12/2009 | Ferris et al. |
| 2009/0300057 | A1 | 12/2009 | Friedman |
| 2009/0300149 | A1 | 12/2009 | Ferris et al. |
| 2009/0300151 | A1 | 12/2009 | Friedman et al. |
| 2009/0300152 | A1 | 12/2009 | Ferris |
| 2009/0300169 | A1 | 12/2009 | Sagar et al. |
| 2009/0300210 | A1 | 12/2009 | Ferris |
| 2009/0300423 | A1 | 12/2009 | Ferris |
| 2009/0300607 | A1 | 12/2009 | Ferris et al. |
| 2009/0300608 | A1 | 12/2009 | Ferris |
| 2009/0300635 | A1 | 12/2009 | Ferris |
| 2009/0300641 | A1 | 12/2009 | Friedman et al. |
| 2009/0300719 | A1 | 12/2009 | Ferris |
| 2010/0042720 | A1 | 2/2010 | Stienhans et al. |
| 2010/0050172 | A1 | 2/2010 | Ferris |
| 2010/0057831 | A1 | 3/2010 | Williamson |
| 2010/0058347 | A1 | 3/2010 | Smith et al. |
| 2010/0125664 | A1* | 5/2010 | Hadar et al. ............... 709/224 |
| 2010/0131324 | A1 | 5/2010 | Ferris |
| 2010/0131590 | A1 | 5/2010 | Coleman et al. |
| 2010/0131624 | A1 | 5/2010 | Ferris |
| 2010/0131649 | A1 | 5/2010 | Ferris |
| 2010/0131948 | A1 | 5/2010 | Ferris |
| 2010/0131949 | A1 | 5/2010 | Ferris |
| 2010/0132016 | A1 | 5/2010 | Ferris |
| 2010/0169477 | A1 | 7/2010 | Stienhans et al. |
| 2010/0169497 | A1* | 7/2010 | Klimentiev et al. .......... 709/228 |
| 2010/0220622 | A1 | 9/2010 | Wei |
| 2010/0299366 | A1 | 11/2010 | Stienhans et al. |
| 2011/0016214 | A1 | 1/2011 | Jackson |
| 2011/0131335 | A1 | 6/2011 | Spaltro et al. |
| 2011/0153727 | A1* | 6/2011 | Li ............... 709/203 |
| 2011/0161947 | A1* | 6/2011 | Ashok et al. ............. 717/168 |
| 2011/0295998 | A1* | 12/2011 | Ferris et al. ............. 709/224 |

OTHER PUBLICATIONS

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud installation information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan "Systems and Methods for Self-Moving Operating System Installation in Cloud-Based Network", U.S. Appl. No. 13/149,877, filed May 31, 2011.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan et al., "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
DeHaan et al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environments", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,095, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.

* cited by examiner

SYSTEMS AND METHODS FOR CROSS-VENDOR MAPPING SERVICE IN CLOUD NETWORKS

FIELD

The invention relates generally to systems and methods for a cross-vendor mapping service in cloud networks, and more particularly, to platforms and techniques for deploying an external service to permit any cloud in a group of clouds to identify the set of vendor software components available in another, external cloud, and generate a compatibility mapping between the appliances or other services or entities hosted in the subject cloud, and the application or other resources set in the target cloud counterpart or counterparts available to construct the same or compatible appliances or other services or entities in those target cloud networks.

BACKGROUND

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated that the cloud processes are functioning properly and/or efficiently, that the cloud is providing sufficient resources to the cloud processes, etc. Due to the user's requirements and usage of the cloud, the user may have many applications and/or processes instantiated in a cloud and may be utilizing multiple independent clouds to support the cloud processes.

As such, when the user plans or intends to deploy new or additional resources to their complement of cloud-based resources, the user may have difficulty determining which applications, appliances, services, and/or other resources can be integrated into new deployments and remain compatible with existing virtual machines and/or each other. In part, these challenges to the design of expanded or inter-cloud networks can relate to the fact that a given vendor located in one cloud may not have visibility on the set of vendors, software choices, and other resources available in another cloud they may wish to host additional parts of their network.

The vendors in that prospective counterpart cloud may register their applications, appliances, and/or other products or services directly to that particular cloud through its cloud management system or an independent software vendor (ISV) repository, but the data captured using those systems may be restricted to local services, and not exposed to the user who is considering their use in that external cloud. Users who wish to access and register new virtual machines, applications, appliances, or other entities in arbitrary external clouds may wish to view and determine compatibility of their intended application set with the applications and other resources of their own host cloud network before configuring or instantiating machines, applications, or services in across those remote cloud boundaries. It may be desirable to provide systems and methods for a cross-vendor mapping service in cloud networks, in which users based in any one or more arbitrary host cloud can access an external service to determine the compatibility of their own intended applications or appliances with those appliances, applications, and/or services populating other arbitrary external cloud or clouds.

DESCRIPTION

Figure 1:
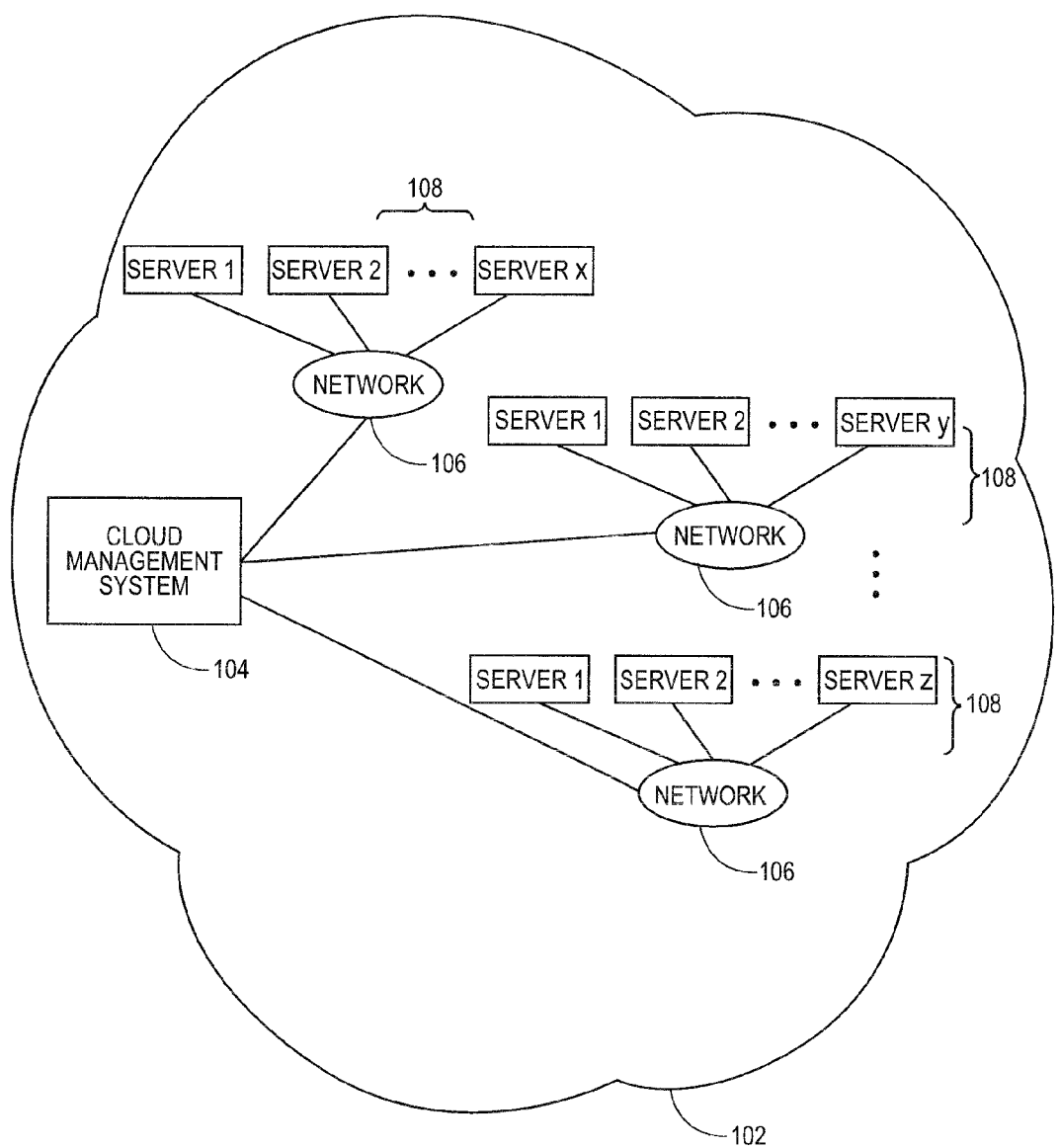
FIG. 1 illustrates an overall cloud system architecture in which various embodiments of the present teachings can be practiced.

Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource: For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
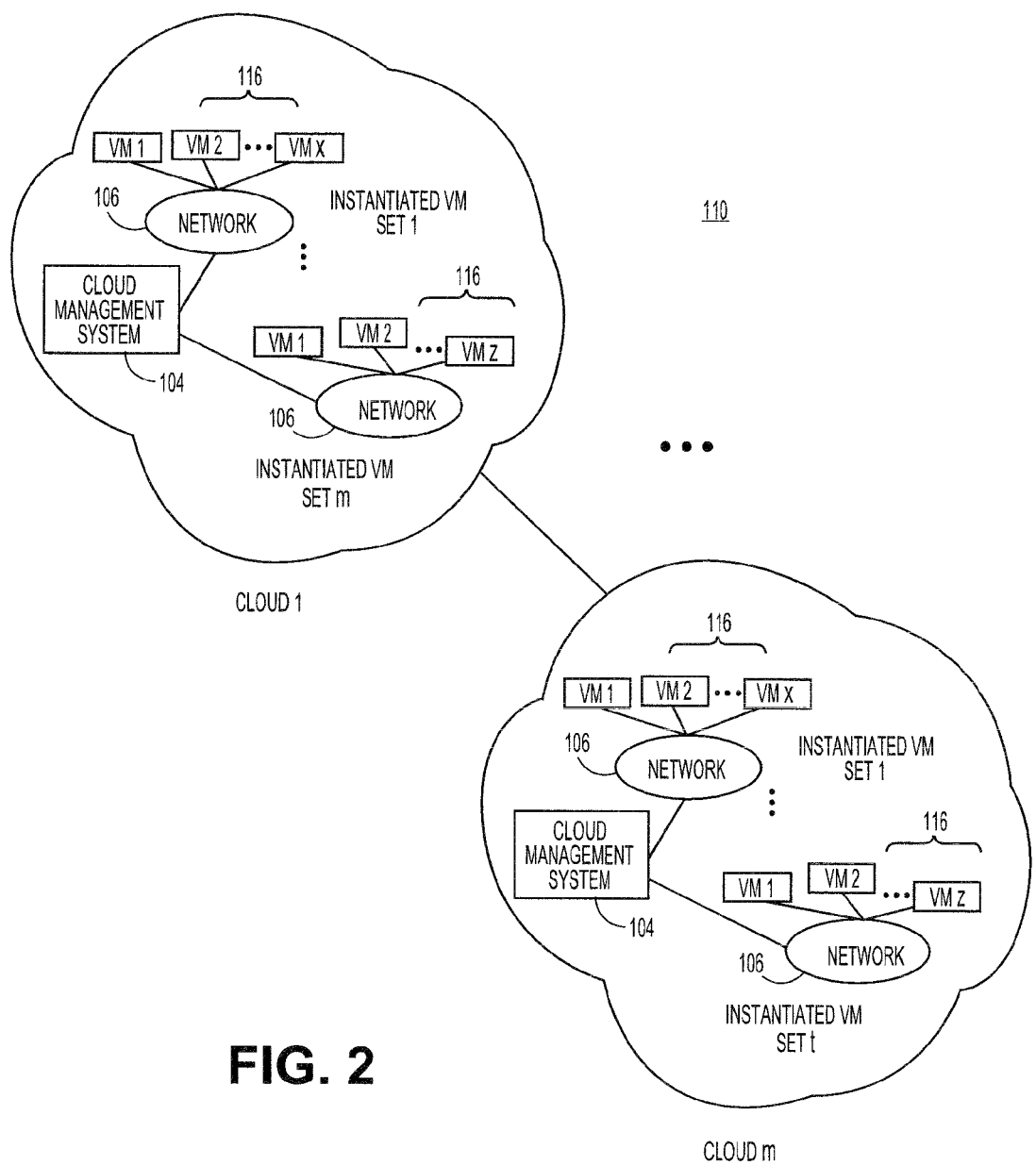
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 114 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated clients 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the main cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
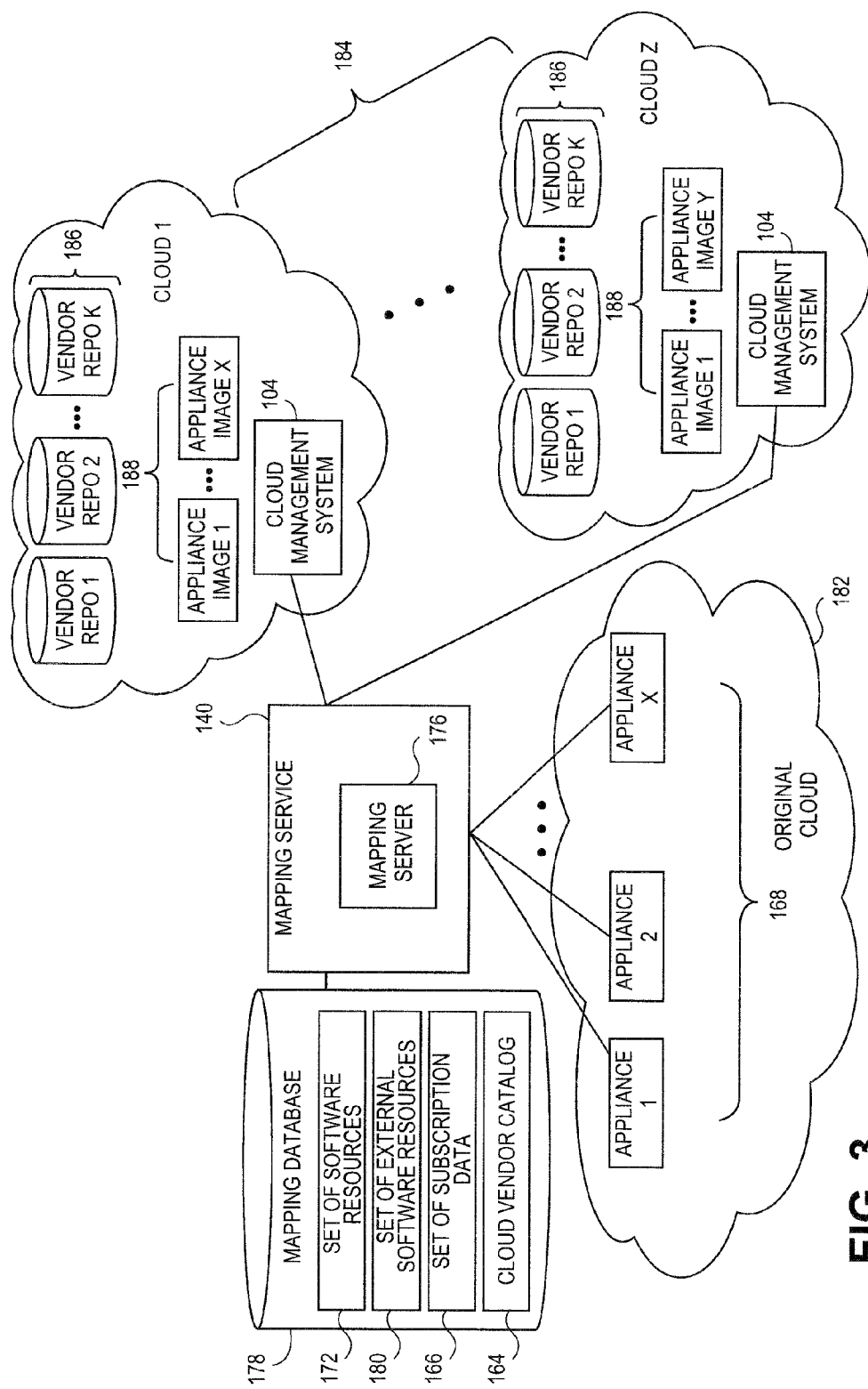
FIG. 3 illustrates a network configuration in which a cloud management system, mapping service and other resource can perform various inter-cloud mapping functions, according to various embodiments.

FIG. 3 illustrates an illustrative network configuration in which systems and methods for a cross-vendor mapping service in cloud networks can be implemented, in various embodiments. In embodiments as shown, a user can operate a set of original appliances 168 in an original cloud 182. In aspects, set of appliances 168 can comprise a set of virtual machines designed and configured to execute and support a specific set of applications or services in original cloud 182, such as, for example, transaction applications or services, messaging applications or services, database applications or services, and/or other appliances, applications, services, and/or other resources. In aspects as shown, the network of original cloud 182 can communicate with an external mapping service 170, which in embodiments may be supported by a mapping server 176 and/or other hardware or other resources. In embodiments as shown, mapping service 170 can access or maintain a mapping database 178, such as a local or remote relational database, in which configuration data for set of original appliances 168 and other entities or resources can be stored. In aspects, mapping database 178 can store a set of software resources 172 related to or associated with set of original appliances 168. Set of software resources 172 can be or include configuration data indicating the operating system, security services, hardware configuration, one or more sets of applications, and/or other resources installed in or supporting set of original appliances 168. Mapping database 178 can likewise store a set of subscription data 166 indicating the user's set of entitlements to applications or services, subscription fees or costs, usage levels or privileges such as number of operating images, service level agreements (SLAs), and/or other details of the user's rights to access or use of any resource of set of original appliances 168 or original cloud 182. Mapping database 178 can likewise maintain a record of a set of cloud vendor catalogs 164 recording the operating system, application, and/or other software or services available in original cloud 182 or other cloud networks. Set of cloud vendor catalogs 164 can for instance store the sets of operating systems, applications, utilities, or other software from independent software vendors (ISVs) or other software providers or sources.

In embodiments as shown, mapping service 170 can serve to access and manage the extension of set of original appliances 168 and/or other machines, services, or resources to a set of external clouds 184 external to original cloud 182. In aspects, set of external clouds 184 can include external clouds generally under the supervision of one or more separate or remote cloud management system 104, separate from the cloud management system 104 managing original cloud 182. In aspects, mapping service 170 can communicate with set of external clouds 184 to determine the software and other resources available in those remote cloud networks, and the compatibility of those resources with the configuration of set of original appliances 168 or other entities. In aspects, mapping service 170 can determine an available set of external software resources 180, including supporting operating systems, applications, and/or other software, hosted in set of external clouds 184 to potentially configure and construct a set of target appliances 188 in those external cloud networks.

More particularly, and as likewise shown in FIG. 3, mapping service 170 can communicate with set of external clouds 184 to capture and record set of external software resources 180 hosted in set of external clouds 184, for instance, by interrogating one or more cloud management system 104 hosting one or more of set of external clouds 184. Mapping service 170 can for instance interrogate, access, and/or run reports using or based on set of vendor repositories 186 located in one or more external cloud, to determine the operating system, applications, and/or other software resources available in each particular cloud environment. In aspects as shown, mapping service 170 can check the set of software resources 172 related to or supporting set of original appliances 168 or other entities against set of external software resources 180, to determine whether matching applications (messaging, security, etc.) incorporate in set of original appliances 168 are also available in set of external clouds 184. In aspects, if a matching software component is located in set of external clouds 184, mapping service 170 can select those same operating system, application, or other components to generate set of target appliances 188. In aspects, if a matching operating system, application, or other component is not located within the set of external software resources 180, mapping service 170 can attempt to substitute one or more other software components, such as the same application in a different version, or a similar application with the same application programming interface (API) or other features to be installed in place of the component used in set of original appliances 182. In embodiments, different clouds in set of external clouds 184 can host or maintain diverse sets of operating system, application, and/or other components or resources. In cases where a compatible match of set of software resources 172 supporting original set of appliances 168 in original cloud 182 can not be made, mapping service 170 can notify the user requesting the determination of compatible software resources and construction of the same or compatible set of target appliances 188 that no matching resources could be located, and/or that instantiation or installation of set of target appliances 188 can not be made in one or more external cloud. In aspects, mapping service 170 can maintain a record of the availability and compatibility of all software resources across the boundaries of original cloud 182 and any one or more clouds in set of external clouds 184, as well as the availability and compatibility of vendor matches or substitutes for all types of operating system, application, and/or other software components. Mapping service 170 can, in aspects, also register and track the configuration data and/or operation of set of original appliances 168, set of target appliances 188, and/or other machines, entities, or services. It may be noted that in aspects, set of target appliances 188 can be configured to be instantiated or operate on a fail-over basis when set of original appliances 182 fails, when that set of appliances runs out of capacity, or based on other conditions or triggers. In further aspects, set of target appliances 188 can be configured to run in conjunction or in tandem with set of original appliances 182, on a continuous, periodic, or other basis.

Figure 4:
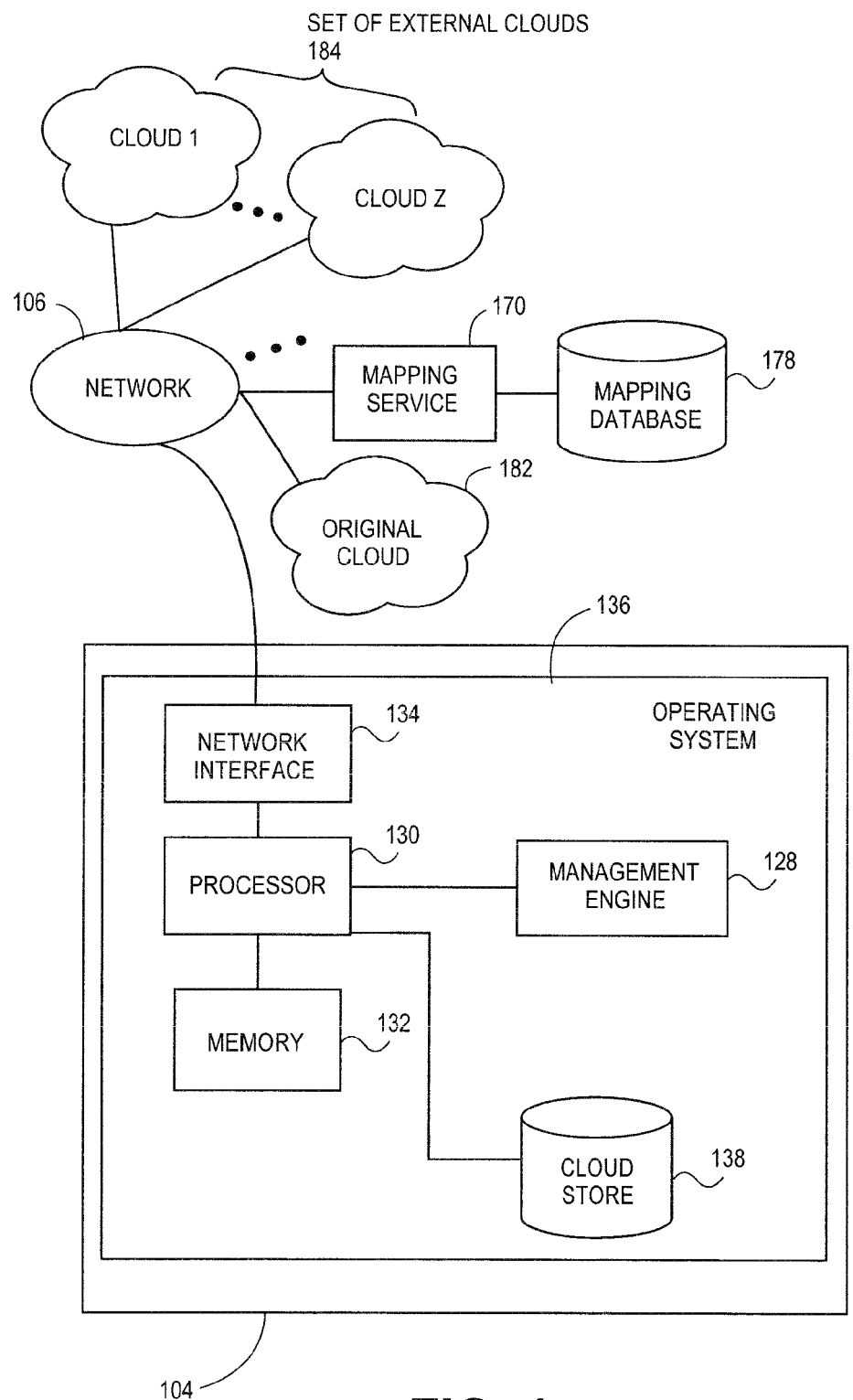
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with set of instantiated virtual machines 116 via one or more networks 106, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with cloud store 138 and management engine 128, to execute control logic and control the operation of virtual machines and other resources in cloud 102. Processor 130 and/or cloud management system 104 can likewise communicate with one or more mapping service via one or more networks 106, as well as set of vendor repositories 186 and other network resources in an original cloud 182 and/or set of external clouds 184. Other configurations of cloud management system 104, associated network connections, and other hardware and software resources are possible.

Figure 5:
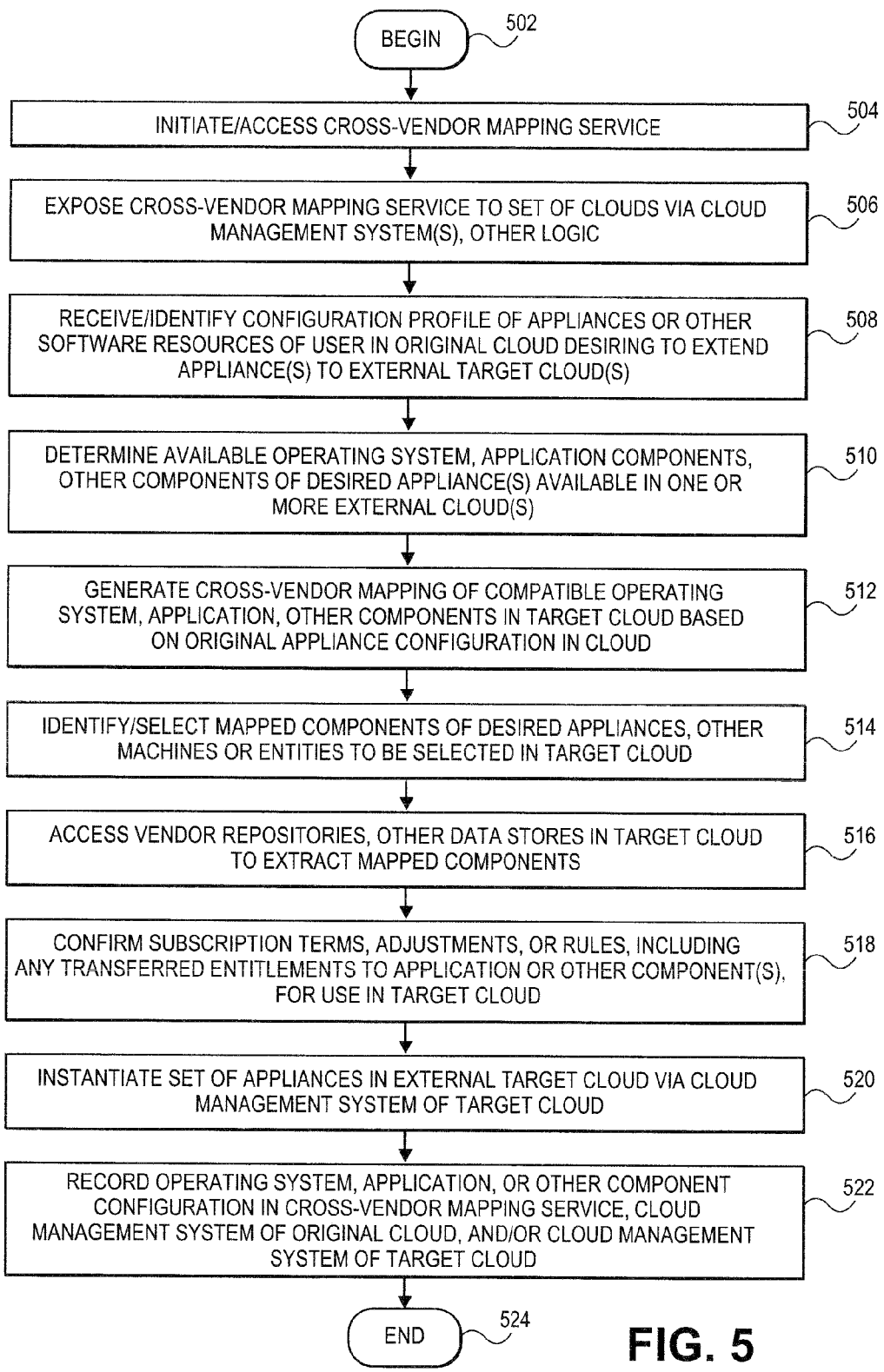
FIG. 5 illustrates a flowchart for overall inter-cloud, cross-vendor mapping and configuration processing in a cloud computing environment, according to various embodiments.

FIG. 5 illustrates a flowchart of overall processing to generate and manage cross-vendor mappings, appliance and other management across diverse cloud sets and architectures, according to various embodiments of the present teachings. In 502, processing can begin. In 504, a user or service can initiate and/or access one or more cross-vendor mapping service 170, such as via an access-controlled Web site or other portal. In aspects the user or service can be associated with one or more original cloud 182, for instance a cloud in which the user or service has already built, configured, and instantiated a set of software resources 172, including, for example, a set of appliances, virtual machines, and/or other entities, resources, and/or services. In 506, mapping service 170 can be exposed to a set of external clouds 184, for instance, via secure connections to the cloud management system 104 of each associated cloud or clouds in set of external clouds 184. In aspects, set of external clouds 184 can be specified via user input. In aspects, set of external clouds 184 can in addition or instead be identified using an automatic discovery process, for instance carried out by mapping service 170, and/or by other services or logic.

In 508, mapping service 170 can access, receive, and/or identify the configuration profile of appliances and/or other software resources in set of software resources 172 of the user or service in the one or more original cloud 182 that the user or service wishes to extend to a set of external clouds 184. In aspects, the software resources that the user or service wishes to extend to set of external clouds 184 can include a set of appliances of the same type or configuration. In aspects, the software resources that the user or service wishes to extend to other external clouds can in addition or instead comprise different sets of diverse appliances having different configurations. In aspects, the software resources the user or service wishes to extend to set of external clouds 184 can in addition or instead include other software resources than appliances. For instance, the software resources desired to be ported, extended, or migrated to set of external clouds 184 can include virtual machines, applications, operating systems, services, and/or other resources that the user or service wishes to build and instantiate in set of external clouds 184. In aspects, the exported software resources can be configured to be installed and run in any one or more clouds in set of external clouds 184 while the set of software resources 172 remains installed and operating in original cloud 182, and/or can be configured to replace those resources in original cloud 182.

In 510, mapping service 170 and/or other logic can determine the available operating system, application components, and/or other components or resources available in set of external resources 180 hosted in or available through any one or more selected clouds in set of external clouds 184. In 512, mapping service 170 and/or other logic can generate a cross-vendor and/or cross-cloud mapping of one or more of the set of software resources 172 used in original cloud 182 to set of external resources 180 in set of external clouds 184 to be used to construct the desired appliances, virtual machines, services, and/or other resources or entities in set of external clouds 184. In aspects, the cross-vendor mapping can identify applications or other resources that may be used or compatibly substituted for existing applications or resources in original cloud 182 to generate the same or compatible appliances or other entities in set of external clouds 184. In cases, the mapping of resources can be on a one-to-one basis, so that, for instance, Messaging Application B from Vendor Y can be substituted in set of external clouds 184 for Messaging Application A from Vendor X hosted in original cloud 182. In cases, substitutions or adjustments need not be made on a one-to-one basis so that, for example, two or more applications together can be selected to substitute or replace one application hosted in original cloud 182. Other mappings, substitutions, configurations, and/or adjustments in set of software resources 172 to translate those resources to the set of external resources 180 available across the boundary of original cloud 182 in set of external clouds 184.

In 514, mapping service 170 and/or other logic can identify or select the mapped components in set of external resources 180 to be used in constructing the desired appliances, virtual machines, and/or other machines, software entities or services to be instantiated in set of external clouds 184. For instance, the entire complement of software components needed to generate appliances or other resources in set of external clouds 184 can be enumerated or recorded. In aspects, when more than one compatible application is available in set of external resources 180 of set of external clouds 184, selection of components to be used can be made based on predetermined criteria. For example, applications or other components from vendors already supplying other applications or components can be selected, and/or applications or other components have a least cost, greatest scalability, and/or other factor or factors can be selected. Other criteria for selection of components of set of external resources 180 used to construct target appliances or other machines, services, or entities can be used.

In 516, mapping service 170 and/or other logic can access set of vendor repositories and/or other sources to extract the mapped components of set of external resources 180 to construct the desired set of target appliances 188 and/or other machines, services, or resources. In 518, mapping service 170 and/or other logic can confirm subscription terms, adjustments, and/or other business rules for use of the selected target components, including any transferred entitlement(s) to applications or other component(s) in set of external resources 180 to be used in set of external clouds 184. In 520, mapping service 170 and/or other logic can instantiate set of target appliances 188 and/or other machines, services, or resources in one or more target clouds in set of external clouds 184, for instance via one or more cloud management system 104 located in or associated with those target cloud networks. In 522, the operating system, application, and/or other component configuration of the resulting set of target appliances 188 and/or other entities can be recorded in mapping service 170, in the cloud management system 104 of the original cloud 182, in one or more cloud management system 104 of set of external clouds 184, and/or other location. In 524, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers or systems. Similarly, while embodiments have been described in which one group of servers within a set of resource servers 108 can provide one component to build a requested set of virtual machines, in embodiments, one group of resource servers can deliver multiple components to populate the requested set of virtual machines 116. For further example, while embodiments have been described in which one mapping service 170 operates to access and manage the software component resources of a home or original cloud and a set of external clouds, in embodiments, multiple mapping services can cooperate to maintain and manage the extension of appliances or other entities on a cross-cloud and/or cross-vendor basis. Other resources described as singular or integrated can in embodiments be plural or distributed, and resources described as multiple or distributed can in embodiments be combined. The scope of the invention is accordingly intended to be limited only by the following claims.

What is claimed:

1. A method of determining software compatibility in a cloud environment, comprising:

identifying a first set of cloud-based software resources hosted in a first cloud-based network;
extracting a set of attributes for a second set of cloud-based software resources in a second cloud-based network external to the first cloud-based network;
generating a compatibility mapping between—
a set of target software entities to be instantiated in the second cloud-based network based on the first set of cloud-based software resources, and
the second set of cloud-based software resources; and
coupling the compatibility mapping to a user-accessible service external to the first cloud-based network and the second cloud-based network.

2. The method of claim 1, wherein the second cloud-based network is selected via user input from a user of the first cloud-based network.

3. The method of claim 1, wherein the set of target software entities comprises at least one of a set of applications, a set of appliances, or a set of services to be hosted in the second cloud-based network.

4. The method of claim 3, wherein the first set of software-based resources comprises a set of configuration settings for at least one of a set of applications, a set of appliances, or a set of services originally hosted in the first cloud-based network.

5. The method of claim 4, wherein the set of target software entities comprises a set of target appliances, and generating a compatibility mapping comprises generating a list of applications available in the second cloud-based network which are compatible to construct the set of target appliances in the second cloud-based network.

6. The method of claim 5, wherein the set of target appliances in the second cloud-based network is configured to operate with the first set of software resources hosted in the first cloud-based network.

7. The method of claim 5, wherein the set of target appliances in the second cloud-based network comprises a set of backup target appliances whose use is triggered by at least one of a failover condition or a network capacity condition.

8. The method of claim 5, further comprising generating an additional set of appliances in the second cloud based-network based on the first set of cloud-based software resources.

9. The method of claim 1, wherein each of the first cloud-based network and the second cloud-based network are managed by a respective separate cloud management system.

10. The method of claim 1, wherein at least one of the first cloud-based network or the second cloud-based network comprises a plurality of clouds.

11. A system for of determining software compatibility in a cloud environment, comprising:
a network interface to a first cloud-based network and a second cloud-based network; and
a processor, communicating with the first cloud-based network and the second cloud-based network, the processor being configured to—
extract a set of attributes for a second set of cloud-based software resources in a second cloud-based network external to the first cloud-based network,
generate a compatibility mapping between—
a set of target software entities to be instantiated in the second cloud-based network based on the first set of cloud-based software resources, and
the second set of cloud-based software resources, and
couple the compatibility mapping to a user-accessible service external to the first cloud-based network and the second cloud-based.

12. The system of claim 11, wherein the second cloud-based network is selected via user input from a user of the first cloud-based network.

13. The system of claim 11, wherein the set of target software entities comprises at least one of a set of applications, a set of appliances, or a set of services to be hosted in the second cloud-based network.

14. The system of claim 13, wherein the first set of software-based resources comprises a set of configuration settings for at least one of a set of applications, a set of appliances, or a set of services originally hosted in the first cloud-based network.

15. The system of claim 14, wherein the set of target software entities comprises a set of target appliances, and generating a compatibility mapping comprises generating a list of applications available in the second cloud-based network which are compatible to construct the set of target appliances in the second cloud-based network.

16. The system of claim 15, wherein the set of target appliances in the second cloud-based network is configured to operate with the first set of software resources hosted in the first cloud-based network.

17. The system of claim 15, wherein the set of target appliances in the second cloud-based network comprises a set of backup target appliances whose use is triggered by at least one of a failover condition or a network capacity condition.

18. The system of claim 15, further comprising generating an additional set of appliances in the second cloud based-network based on the first set of cloud-based software resources.

19. The system of claim 11, wherein each of the first cloud-based network and the second cloud-based network are managed by a respective separate cloud management system.

20. The system of claim 11, wherein at least one of the first cloud-based network or the second cloud-based network comprises a plurality of clouds.

* * * * *